United States Patent Office 3,445,971
Patented May 27, 1969

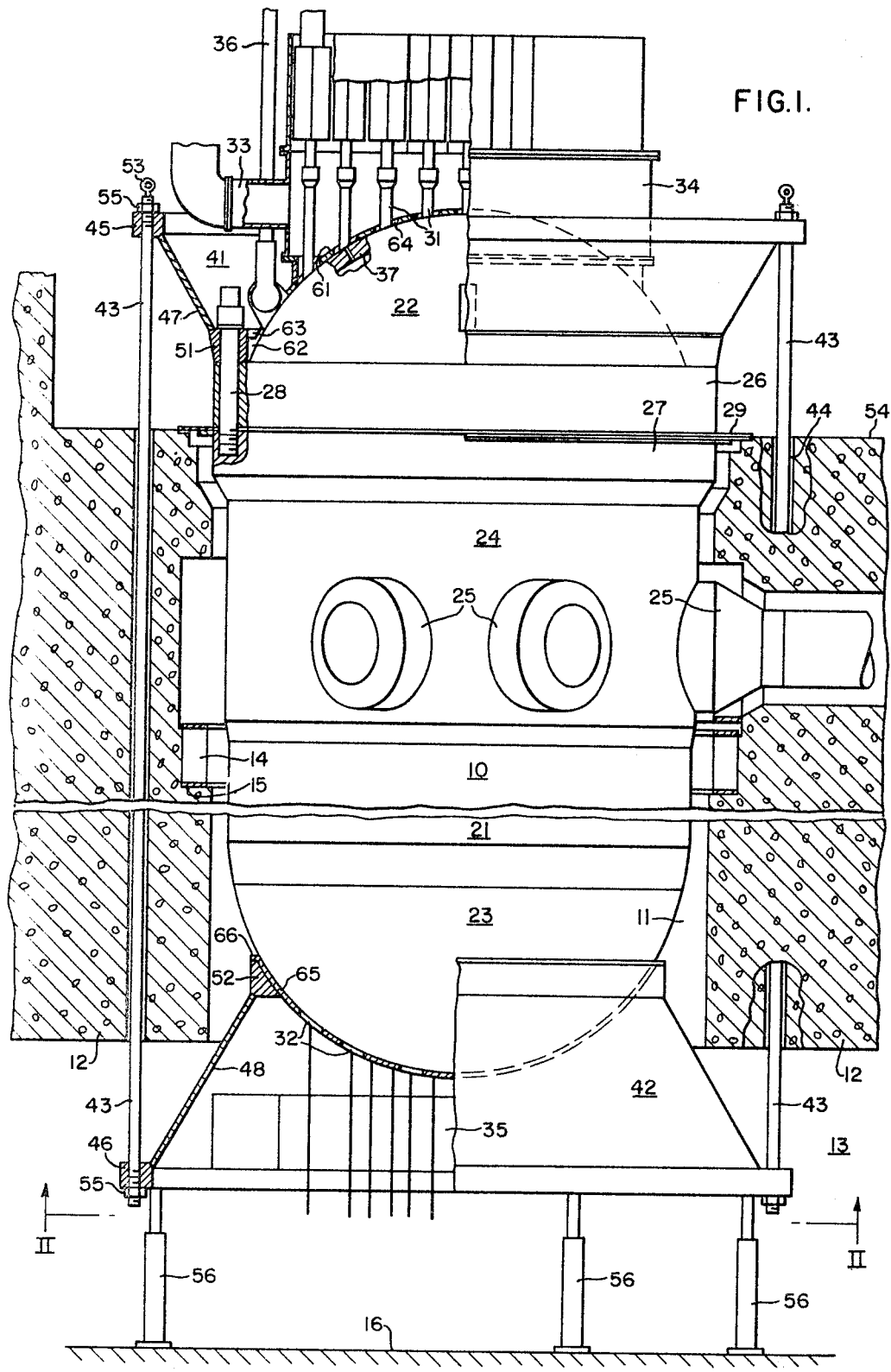

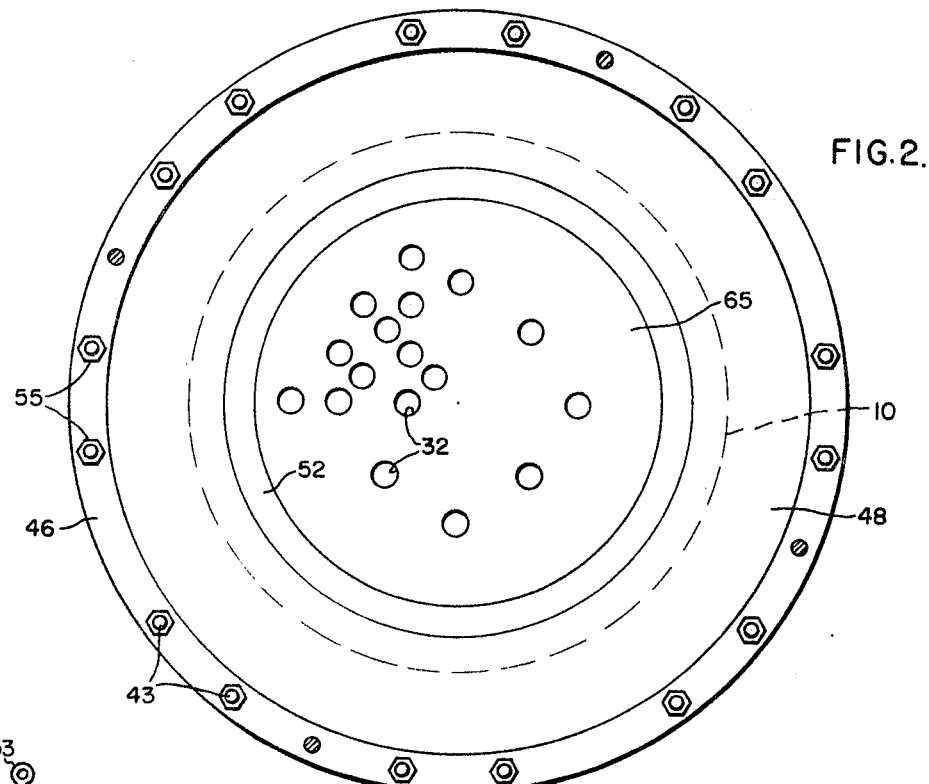
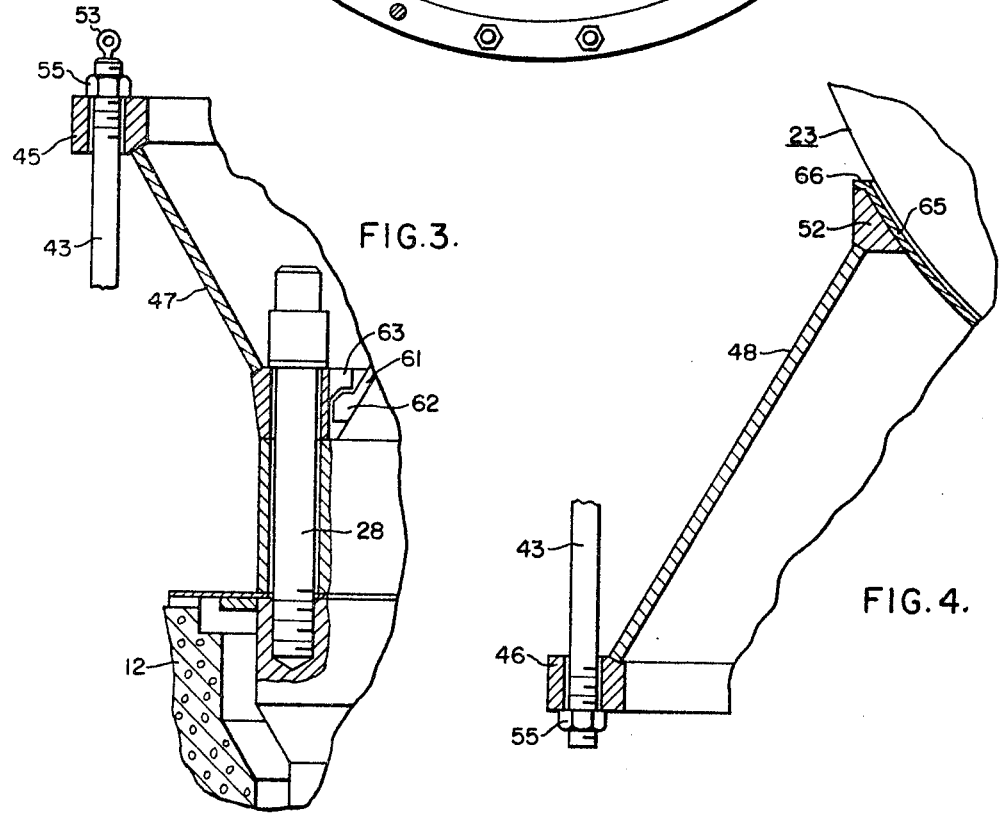

3,445,971
HIGH PRESSURE VESSEL HOLD-TOGETHER STRUCTURE
Walter E. Desmarchais, Monroeville, and Howard E. Braun, Pittsburgh, Pa., assignors to Westinghouse Electric Corporation, Pittsburgh, Pa., a corporation of Pennsylvania
Filed Mar. 2, 1967, Ser. No. 620,075
Int. Cl. E04b 1/32; E04h 7/14; F25j 1/00
U.S. Cl. 52—80
9 Claims

ABSTRACT OF THE DISCLOSURE

A structure which will hold a high pressure nuclear reactor vessel together in the event of a major vessel fracture and prevent the generation of missiles which might cause a breech in the system secondary containment. The structure concept is predicated upon the principle that for every force there is an equal and opposite reaction. The thrust forces on the vessel fragments are so connected to one another by a yoke or clamp structure that the net external force on the connected parts is zero.

---

This invention relates, generally, to nuclear reactors and, more particularly, to reactor vessels which are subjected to high internal pressure.

The thick walled steel vessels utilized to contain reactors of the pressurized liquid type are made of welded, forged and rolled sections to which is bolted a hemispherical head closure. The design and manufacturing procedures using certain industry design codes, shop practices, inspection and controls have resulted in the generally accepted opinion that a failure of the vessel leading to rapid depressurization of the vessel is an incredible possibility. However, the concern about the serious consequences of a large vessel fracture due to unknown or unanticipated effects of neutron exposure and changes in the fracture toughness of the vessel wall, even though remotely possible, have drawn attention to the necessity for a positive safeguard against the consequences of certain modes of pressure vessel failure which might cause a breech in the system secondary containment.

The high pressure inside a reactor vessel and its large diameter cause large axial loading on the vessel ends, equal to the design unit pressure (P) times the effective area, $\pi/4$ (vessel diameter)$^2$. For example, for 2500 p.s.i. and 154" I.D. the end loading equals about 47 million pounds. In the postulated event of a horizontal rupture of the vessel, forces as large as these may impel fragments outwardly with missile-like force. The vessel parts and internal components may weigh as much as one or two million pounds. Adjacent concrete masses may weigh about $\frac{1}{10}$ to $\frac{1}{5}$ the impulse forces. Therefore, it is hard to find adequate masses or ground anchorage for the large separation forces.

An object of this invention is to provide a structure for holding a pressure vessel together in the event of a major vessel fracture.

Another object of the invention is to provide a hold-together structure which does not preload the vessel during its normal service or stress it during normal thermal and pressure cycling.

A further object of the invention is to provide a hold-together structure for a reactor vessel which does not interfere with removal of the vessel head for refueling or fuel handling.

Still another object of the invention is to provide a hold-together structure for a reactor vessel which does not require altering the design, manufacture or mode of operation of the vessel in service.

Other objects of the invention will be explained fully hereinafter or will be apparent to those skilled in the art.

In accordance with one embodiment of the invention, the upper and lower hemispherical heads or ends of a reactor vessel are held together by cone-like yokes at both upper and lower ends tied together with heavy rods which extend through annular flanges or rings on the outer rims of the yokes. Hemispherical high strength steel shields are retained over the upper and lower ends by annular flanges on the inner rims of the yokes. The upper yoke is secured on the upper end or head by the head bolts which extend through the flange on the inner rim of the yoke. The tie rods connecting the two yokes extend through conduits in concrete surrounding the vessel where they are shielded from radiation.

For a better understanding of the nature and objects of the invention, reference may be had to the following detailed description, taken in conjunction with the accompanying drawings, in which:

FIGURE 1 is a view, partly in elevation and partly in section, of a reactor vessel and hold-together structure embodying principal features of the invention;

FIG. 2 is a bottom plan view of the structure shown in FIG. 1; and

FIGS. 3 and 4 are enlarged views of portions of the hold-together structure.

In FIGURE 1 of the drawings a reactor vessel 10 is positioned in a well 11 in a concrete enclosure 12 surrounding the vessel 10. A horizontal passageway 13 is provided in the concrete enclosure 12 at the bottom of the well 11. The vessel 10 is supported by a ring-girder 14 secured to the vessel and resting on a ledge 15 in the concrete enclosure 12. Thus, the lower end of the vessel 10 is disposed above a concrete floor 16 to provide a space between the bottom of the vessel and the floor. The concrete enclosure 12 constitutes part of the secondary containment for a nuclear power system for which the reactor is the source of energy. The secondary containment is provided to prevent the escape of radioactive material into the surrounding atmosphere. The reactor is of the pressurized liquid type and, therefore, the vessel 10 is subjected to relatively high internal pressure.

The vessel 10 has a generally cylindrical body 21, a generally hemispherical upper head or end 22 and a generally hemispherical lower end 23. The body 21 includes a nozzle section 24 having a plurality of nozzles 25 therein for connecting the piping for the primary loops of the reactor power system. The lower end 23 is welded to the cylindrical body 21. Likewise, the nozzle section 24 is welded to the body 21. The upper end 22 has a bolting flange 26 which is bolted to a bolting flange 27 on the nozzle section 24 by means of a plurality of head bolts 28, only one of which is shown. A sealing ring 29 is provided between the flanges 26 and 27.

Control rod drive ports or tubes 31 are provided in the upper head or end 22. Likewise, instrumentation line ports 32 are provided in the lower end 23. An air duct 33 and air baffle 4 are shown at the top of the vessel 10. A ventilation duct 35 is shown at the bottom of the vessel in the passageway 13. A lifting rod 36 is attached to the head 22. Additional lifting rods (not shown) are provided for lifting the head 22 of the vessel. In the interest of simplicity, the control rod drive mechanism and accessory apparatus are not shown.

As indicated at 37, the vessel 10 is composed of thick walled forged and rolled steel sections which are welded together. Therefore, the possibility of a failure or rupture of the vessel is very remote. However, in view of the serious consequences of a large vessel fracture due to unknown effects of neutron exposure and changes in the fracture toughness of the vessel wall, it is desirable to provide a positive safeguard against the consequences of certain modes of vessel failure which might cause a breech in the system secondary containment.

In order to provide a structure which will hold the vessel 10 together in the event of a major vessel fracture, prevent the generation of missiles and a consequential breech through the system secondary containment, an inverted cone-like yoke 41 is provided at the upper end of the vessel and an upright cone-like yoke 42 is provided at the lower end of the vessel. The yokes 41 and 42 are connected together by tie means such as a plurality of heavy tie rods 43 which extend through conduits 44 provided in the concrete enclosure 12. Since the rods 43 extend through concrete, they are shielded from high intensity radiation. In the illustrated embodiment of the invention, the rods 43 extend through annular flanges 45 and 46 secured to the outer rims of walls 47 and 48 of the yokes 41 and 42, respectively. Annular flanges 51 and 52 are secured to the inner rims of the walls 47 and 48, respectively. The annular flanges are preferably welded to the rims of the yoke walls in the manner shown. It will be understood that a plurality of spaced bars or spokes may be utilized in place of the walls 47 and 48.

The flange 51 rests upon, and is attached to the bolting flange 26 of the upper end 22 by means of the head bolts 28. Thus, when it is necessary to remove the head or end 22, for refueling, or for other reasons, the yoke 41 may be removed with the head without requiring any special handling.

The tie rods 43 may be spaced around the flanges 45 and 46 in the manner shown in FIG. 2. As also shown in FIG. 2, the ring or flange 52 is of a smaller circumference than the vessel 10, the outside diameter of which is indicated by the dotted circle in FIG. 2. Since the flange 52 is smaller in circumference than the vessel 10 it will engage the lower hemispherical end 23 as shown in FIG. 1.

A lifting eye 53 is provided in the upper end of each rod 43. Thus, the rods 43 may be lowered below the refueling canal floor 54 during refueling of the reactor. The rods 43 may be raised and lowered by a crane or other suitable mechanism.

In order to provide for thermal expansion of the reactor vessel the effective length of the means for tying the yokes 41 and 42 together is adjustable. Thus, the nuts 55 which are threaded onto the ends of the tie rods 43 to engage the flanges 45 and 46 are adjusted to provide clearance between the flange 52 and the hemispherical end 23 when the vessel is cold. Lifting jacks 56, which rest on the concrete floor 16, may be utilized to raise and lower the bottom yoke 42.

In order to prevent fragments of the upper hemispherical end 22 from damaging the secondary containment, a hemispherical shield 61 is provided over the hemispherical end 22. As shown more clearly in FIG. 3, the shield 61 has a bead 62 around its rim. The bead 62 is disposed to be engaged by an annular projection 63 on the ring or flange 51. In order to provide for thermal expansion of the head 22, clearance is provided between the bead 62 and the projection 63 when the vessel is cold. The shield 61 is composed of a high tensile strength steel. Thus, it has sufficient strength to prevent the escapement of fragments of the head 22 even though the shield is weakened slightly by openings 64 in the shield for the control rod ports or tubes 31.

A shield 65, similar to the shield 61, underlies the lower hemispherical end 23. As shown more clearly in FIG. 4, the shield 65 is supported by the ring or flange 52 and rests on the flange with clearance between the shield and the outer surface of the hemispherical end 23 when the vessel is cold. The shield 65 may be provided with a bead 66 which is engaged by the upper edge of the flange 52 as shown in FIG. 4. Thus, the shield 65 will prevent the escape of fragments of the lower end 23. The shield 65 will also protect the bottom of the vessel from damage by pieces of material which might rebound from the floor 16 in case of a vessel failure.

In the event of a circumferential vessel failure, the upward force is resolved into a vertical component borne by the tie rods 43 and a horizontal force resisted by the flange 45 on the rim of the yoke 41. The relatively short length of the cone-like yoke provides a stiff structure which resists buckling. The forces between the vessel fragments are restrained by stress or strain energy in the clamping yoke structure and rods or cables which hold the upper and lower members of the structure together. The energy released by vessel failure is dissipated as stress or strain energy in the hold-together structure.

The hold-together structure herein described does not preload the reactor vessel during its normal service or stress it during normal thermal and pressure cycling. Minimum connections or attachments are needed to the reactor pressure vessel. Therefore, it is not necessary to alter the vessel design, manufacture, or mode of operation in service in order to utilize the present hold-together structure.

As previously explained, the ring or flange 51 of the upper yoke 41 lies directly on the bolting flange 26 of the head or end 22 and it may be removed with the head by removing the head bolts 28. The outer ring or flange 45 does not interfere with the removal of the head bolts. Thus, the hold-together structure does not retard removal of the head for refueling or fuel handling.

From the foregoing description it is apparent that the invention provides a safeguard against the consequences of certain modes of pressure vessel failure which might be postulated to cause a breech in the secondary containment for a nuclear power system. The hold-together structure ties the upper and lower heads of the reactor vessel together in a vice-like fashion independently of the surrounding concrete. The hold-together structure may be readily manufactured and installed.

Since numerous changes may be made in the above-described construction and different embodiments of the invention may be made without departing from the spirit and scope thereof, it is intended that all subject matter contained in the foregoing description or shown in the accompanying drawing shall be interpreted as illustrative and not in a limiting sense.

We claim as our invention:

1. A hold-together structure for a high pressure vessel having a generally cylindrical body and generally hemispherical upper and lower ends, said upper end comprising a removable cover, said structure comprising a first yoke engaging said cover, bolt means securing said cover to said vessel, a second yoke engaging the lower end, tie means connecting said yokes together, said yokes being hollow and frusto-conical in shape, the inner edges of the smaller ends of said yokes engaging said vessel, and the tie means inter-connecting the larger ends of the yokes.

2. The structure defined in claim 1 including a generally hemispherical rupture shield generally conforming in shape with and covering said cover, and said shield being retained in position by said first yoke.

3. The structure defined in claim 1 including a generally hemispherical protective shield underlying and engaging the lower end, and said shield being supported by said second yoke.

4. The structure defined in claim 1 including a concrete enclosure surrounding the vessel and having conduits therein through which said tie means extend.

5. The structure defined in claim 1 wherein each yoke comprises spaced inner and outer annular members rigidly connected together.

6. The structure defined in claim 1 wherein the tie means are adjustable in effective length.

7. A hold-together structure for a high pressure vessel having a generally cylindrical body and generally hemispherical upper and lower ends, said structure comprising a yoke engaging the upper end, a yoke engaging the lower end, each of said yokes comprising spaced inner and outer annular members rigidly connected together, tie means connecting said yokes together, head bolts for holding the upper end on the body of the vessel, and said bolts extending through the inner annular member of the upper yoke to retain said upper yoke on the upper end of the vessel.

8. A hold-together structure for a high pressure vessel having a generally cylindrical body and generally hemispherical upper and lower ends, said structure comprising a yoke engaging the upper end, a generally hemispherical rupture shield covering the upper end, and said shield being retained in position by the upper yoke, a yoke engaging the lower end, tie means connecting said yokes together, said rupture shield having a bead around its rim, and the upper cone-like yoke having a flange around its inner rim with an annular projection thereon disposed to engage said bead.

9. A hold-together structure for a high pressure vessel having a generally cylindrical body and generally hemispherical upper and lower ends, said structure comprising a yoke engaging the upper end, a yoke engaging the lower end, a generally hemispherical protective shield underlying the lower end, and said shield being supported by the lower cone-like yoke, tie means connecting said yokes together, said lower cone-like yoke having a flange around its inner rim having a circumference smaller than the circumference of the vessel and disposed to engage said protective shield which is disposed between said flange and the lower end of the vessel.

References Cited

UNITED STATES PATENTS

| | | | |
|---|---|---|---|
| 1,237,093 | 8/1917 | Priddy | 220—12 |
| 2,962,182 | 11/1960 | Rossheim | 220—3 |
| 3,199,712 | 8/1965 | Narkiewicz | 220—3 |
| 3,256,069 | 6/1966 | Peterson | 220—3 |

FOREIGN PATENTS 845,305   8/1960   Great Britain.

HENRY C. SUTHERLAND, *Primary Examiner.*

U.S. Cl. X.R.

52—98, 194, 224; 220—3, 5